(12) United States Patent
Suwa et al.

(10) Patent No.: US 7,787,519 B2
(45) Date of Patent: Aug. 31, 2010

(54) PREAMBLE TRANSMISSION METHOD, MOBILE STATION, MOBILE COMMUNICATION SYSTEM, PREAMBLE TRANSMISSION PROGRAM AND COMPUTER DATA SIGNAL

(75) Inventors: Shingo Suwa, Kanagawa (JP); Hiroyuki Atarashi, Kanagawa (JP); Mamoru Sawahashi, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 1295 days.

(21) Appl. No.: 10/250,760

(22) PCT Filed: Nov. 8, 2002

(86) PCT No.: PCT/JP02/11695

§ 371 (c)(1),
(2), (4) Date: Jul. 8, 2003

(87) PCT Pub. No.: WO03/041438

PCT Pub. Date: May 15, 2003

(65) Prior Publication Data

US 2004/0071194 A1 Apr. 15, 2004

(30) Foreign Application Priority Data

Nov. 8, 2001 (JP) .............................. 2001-343557

(51) Int. Cl.
*H04B 1/69* (2006.01)
(52) U.S. Cl. .................. 375/146; 375/141; 375/140; 375/130; 370/329; 370/335; 370/320; 370/318; 455/448; 455/522; 455/436; 455/443
(58) Field of Classification Search .......... 370/441, 370/431, 335, 329, 320, 318; 375/141, 146, 375/259, 232, 148, 140, 130; 455/522, 448, 455/436, 443
See application file for complete search history.

(56) References Cited

U.S. PATENT DOCUMENTS 5,852,630 A * 12/1998 Langberg et al. ............ 375/219
6,078,572 A 6/2000 Tanno et al.
6,195,534 B1 * 2/2001 Sakoda et al. ................ 455/45

(Continued)

FOREIGN PATENT DOCUMENTS

EP 0 920 226 A2 6/1999

(Continued)

OTHER PUBLICATIONS

V. Dasilva et at.: "Performance of orthogonal CDMA codes for quasi-synchronous communication systems" International Conference on Universal Personal Communications, vol. 2, pp. 995-999 Ottawa, Canada, 1993.

(Continued)

*Primary Examiner*—Eva Y Puente
(74) *Attorney, Agent, or Firm*—Oblon, Spivak, McClelland, Maier & Neustadt, L.L.P.

(57) ABSTRACT

With the object of efficiently transmitting a variety of different information signals by utilizing the multi-carrier characteristics of Multi-carrier/DS-CDMA, the present invention is characterized in that, when, in an uplink transmission from a plurality of mobile stations to a base station, the mobile stations transmit a preamble to the base station before transmitting an information symbol sequence, the mobile stations individually select a carrier from among a plurality of carriers, and, up until receiving a preamble receipt confirmation signal from the base station with a prescribed maximum number of preamble transmissions serving as an upper limit number; the mobile stations repeatedly transmit a preamble by means of the selected carrier and vary the transmission power used for the transmissions of each carrier.

15 Claims, 14 Drawing Sheets

U.S. PATENT DOCUMENTS

| | | | |
|---|---|---|---|
| 6,269,088 B1 | | 7/2001 | Masui et al. |
| 6,654,408 B1 * | | 11/2003 | Kadous et al. ............... 375/148 |
| 6,937,641 B2 * | | 8/2005 | Li et al. ...................... 375/141 |
| 2002/0041635 A1 * | | 4/2002 | Ma et al. ..................... 375/267 |
| 2002/0172180 A1 * | | 11/2002 | Hall et al. .................... 370/342 |
| 2002/0181421 A1 * | | 12/2002 | Sano et al. ................... 370/335 |
| 2004/0081115 A1 * | | 4/2004 | Parsa et al. .................. 370/320 |
| 2006/0072519 A1 * | | 4/2006 | Hayama et al. .............. 370/335 |

FOREIGN PATENT DOCUMENTS

| | | |
|---|---|---|
| GB | 2300546 | 11/1996 |
| JP | 8-502151 | 3/1996 |
| JP | 2001-268051 | 9/2001 |
| WO | WO 93/21692 | 10/1993 |
| WO | WO 00/51245 | 8/2000 |
| WO | WO 00/56107 * | 9/2000 |

OTHER PUBLICATIONS

Shingo Suwa et al.: "Nobori link broad band multicarrier DS-CDMA packet musen access ni okeru 1 carrier atari no saiteki musen taiikihaba" The Intstitute of Electronics, Information and Communication Engineers Gijutsu Hokoku RCS2001-6, The Institute of Electronics, Information and Communication Engineers.

3GPP RAN, 3G TS25.211 V3.5.0 Dec. 2000.

S. Kondo et al.: "On the performance of multi-carrier DS CDMA systems" IEEE Transactions on Communications, vol. 44, No. 2, pp. 238-246, Feb. 1996.

"Universal Mobile Telecommunications System (UMTS); Physical layer procedures (FDD) (3GPP TS 25.214 version 3.5.0 Release 1999); ETSI TS 125 214," ETSI Standards, LIS, Sophia Antipolis Cedex, France, vol. 3-R1, No. V3.5.0, ISSN: 0000-0001, pp. 1-48, Dec. 2000, XP014016697.

S. P. W. Jarot et al, "Each Carrier Transmission Power Control for the Reverse Link of OFDM-DS-CDMA System," IEICE Transactions on Communications, Communications Society, Tokyo, JP, vol. E82-B, No. 11, ISSN: 0916-8516, pp. 1851-1857, Nov. 1999, XP001063768.

V. Dasilva et al.: "Performance of orthogonal CDMA codes for quasi-synchronous communication systems" International Conference on Universal Personal Communications, vol. 2, pp. 995-999 Ottawa, Canada, 1993.

Shingo Suwa et al.: "Nobori link broad band multicarrier DS-CDMA packet musen access ni okeru 1 carrier atari no saiteki musen taiikihaba" The Intstitute of Electronics, Information and Communication Engineers Gijutsu Hokoku RCS2001-6, The Institute of Electronics, Information and Communication Engineers 1996.

3GPP RAN, 3G TS25.211 V3.5.0 Dec. 2000.

S. Kondo et al.: "On the performance of multi-carrier DS CDMA systems" IEEE Transactions on Communications, vol. 44, No. 2, pp. 238-246, Feb. 1996.

* cited by examiner

PREAMBLE TRANSMISSION METHOD, MOBILE STATION, MOBILE COMMUNICATION SYSTEM, PREAMBLE TRANSMISSION PROGRAM AND COMPUTER DATA SIGNAL

TECHNICAL FIELD

The present invention relates to a preamble transmission method according to which, in an uplink transmission from a mobile station to a base station to which Direct Sequence Code Division Multiple Access that employs a plurality of carriers (Multi-carrier/DS-CDMA) is applied, the mobile station transmits a preamble to the base station before transmitting an information symbol sequence, and relates to this mobile station, a mobile communications system including the base station and the mobile station, a preamble transmission program, and a computer data signal. Further, 'preamble' denotes a control signal with a short transmission time.

BACKGROUND ART

The uplink, which constitutes a communication from the mobile station to the base station of the mobile communications system, involves so-called random access type communication in which signals whereby mobile stations individually start a communication are randomly transmitted, or in which mobile stations randomly transmit signals intermittently by means of units known as packets. Therefore, in a case where signals which are transmitted individually by a plurality of mobile stations are simultaneously received by the base station, there is the possibility that collision between these signals will be generated and that the signals will not be correctly received by the base station.

Therefore, with Wideband Code Division Multiple Access (W-CDMA), which is one of the third generation mobile communications wireless access system, a random access type transmission as indicated by "3GPP RAN, 3G TS25.211V3.5.0, December 2000" is performed as follows. First, before transmitting a packet that includes the information symbol sequence to be transmitted, each mobile station transmits a temporally short signal which is spread by means of a predetermined spreading code which is known as a preamble, and the transmission continues until the preamble is detected by the base station or until the number of transmissions reaches to a predetermined number. Further, the base station performs preamble detection and, when a preamble is detected, transmits a corresponding receipt confirmation signal. Also, each mobile station performs packet transmission only upon receiving a receipt confirmation signal from the base station which corresponds with the transmitted preamble.

On the other hand, Multi-carrier/DS-CDMA, which combines multi-carrier modulation and Direct Sequence Code Division Multiple Access (DS-CDMA), has been proposed and investigated. Multi-carrier/DS-CDMA features the division of the available bandwidth into a plurality of frequency bands and DS-CDMA transmission on these frequency bands. To cite an example of Multi-carrier/DS-CDMA, according to cdma2000, which is one of the third generation mobile communications wireless access system, a system in which a 1.25 MHz bandwidth DS-CDMA signal is transmitted in parallel on three carriers in a down-link has become standardized. Further, "Performance of Orthogonal CDMA Codes for Quasi-Synchronous Communication Systems" (V. DaSilva, E. Sousa: Proc. of ICUPC'93, vol. 2, pp. 995-999, 1993), which is an example of an investigation of Multi-carrier/DS-CDMA transmission, proposes a method for performing semi-synchronous transmission that is applied to communications from a mobile station to the base station of the mobile communications system by utilizing the fact that the symbol length of a multi-carrier transmission is larger.

Further, "On the Performance of Multi-carrier DS CDMA Systems," (S. Kondo and L. B. Milstein: IEEE Transactions on Communications, vol. 44, no. 2, pp. 238-246, February 1996) describes performing a performance evaluation in an environment in which narrowband interference is present and illustrates the fact that characteristics over the whole band are more favorable than those yielded by Single Carrier/DS-CDMA that employs a single carrier. Also, "Optimum Bandwidth per Sub-carrier of Multicarrier/DS-CDMA for Broadband Packet Wireless Access in the Reverse Link" (Suwa, Atarashi, Abeta, Sawahashi: IEICE Technical Report RCS2001-6, April 2001) illustrates the effectiveness of Multi-carrier/DS-CDMA transmission in which the bandwidth is divided.

However, in Multi-carrier/DS-CDMA, a preamble transmission method using multiple carriers has not been established, and there has been a demand for the efficient transmission of a variety of different kinds of information signals by means of preamble transmission that utilizes multi-carrier characteristics.

The present invention was conceived with a view to resolving the above problem, and has, as an object, the provision of a preamble transmission method, a mobile station, a mobile communications system, a preamble transmission program and a computer data signal which permit preamble transmission suited to Multi-carrier/DS-CDMA and which make it possible to efficiently transmit a variety of different kinds of information signals by means of a random access signal by utilizing multi-carrier characteristics.

DISCLOSURE OF THE INVENTION

In order to achieve the above object, the preamble transmission method according to the present invention is a preamble transmission method according to which, in an uplink transmission from each of a plurality of mobile stations to a base station, to which a direct sequence code division multiple access system that employs a plurality of carriers, is applied, the mobile stations transmit a preamble to the base station before transmitting an information symbol sequence, characterized by comprising: a first carrier selection step in which the mobile stations individually select a carrier from among a plurality of carriers; and a transmission control step in which, up until receiving a preamble receipt confirmation signal from the base station with a predetermined maximum number of preamble transmissions serving as an upper limit number, the mobile stations repeatedly transmit a preamble by means of the selected carrier and vary the transmission power used for the transmissions of each carrier.

That is, FIG. 11 shows a flowchart for transmission control processing in accordance with a preamble transmission method executed individually for each mobile station. As shown in this figure, first of all, in S01, a carrier is selected from among a plurality of carriers (first carrier selection step). Then, in S02, a preamble is transmitted by means of the selected carrier and the transmission power used in the transmission for each carrier is varied. Further, the processing in S02 is repeatedly executed until either the mobile station receives a preamble transmission receipt confirmation signal from the base station (judged affirmatively in S03), or the number of transmissions reaches a prescribed maximum number of preamble transmissions (judged affirmatively in S03). The processing of S02 to S04 is equivalent to the transmission control steps of the present invention.

Further, as shown in FIGS. 3, 4A and 4B and so forth, "the transmission power is varied" includes an aspect in which the transmission power is simply gradually increased and an aspect in which the preamble transmission power is increased or decreased and the step size when the transmission power is gradually increased in increased or decreased, on the basis of broadcast information that includes the total transmitted packet volume and the transmitted packet volume of each carrier, and the priority level and information volume of the transmitted information symbol sequence, and the number of carriers, and so forth.

Further, in the above-described first carrier selection step, the mobile stations desirably select a carrier on the basis of at least one of broadcast information that includes the total transmitted packet volume and the transmitted packet volume by each carrier which are reported by the base station, and the priority level and information volume of the transmitted information symbol sequence.

Also, in the transmission control step, the mobile stations desirably vary the transmission power on the basis of at least one of broadcast information that includes the total transmitted packet volume and the transmitted packet volume of each carrier which are reported by the base station, the priority level and information volume of the transmitted information symbol sequence, and the number of carriers transmitting a preamble.

Furthermore, in the transmission control step, the mobile stations desirably allocate a spreading code pattern to the transmitted preamble on the basis of predetermined rules.

Also, in the transmission control step, the mobile stations desirably vary the spreading code pattern allocated to the preamble on the basis of at least one of the priority level and the information volume of the transmitted information symbol sequence.

In addition, the preamble transmission method desirably further comprises: a second carrier selection step in which, upon receiving a preamble receipt confirmation signal from the base station, the mobile stations select a carrier from among carriers by means of which a receipt-confirmed preamble has been transmitted; and an information transmission step in which the mobile stations transmit an information symbol sequence by means of the selected carrier.

That is, FIG. 12 shows a flowchart for transmission control processing pertaining to the above-described transmission of the information symbol sequence. As shown in this figure, first of all, in S11, the above-described basic transmission control processing in FIG. 11 is performed. When a preamble receipt confirmation signal is received in this processing (in the event of an affirmative judgment in S12), in S13 a carrier is selected from among carriers by means of which a receipt-confirmed preamble has been transmitted (second carrier selection step). Then, in S14, the information symbol sequence is transmitted by means of the selected carrier (information transmission step).

Further, the preamble transmission method desirably further comprises a third carrier selection step in which, upon receiving a preamble receipt confirmation signal from the base station, the mobile stations select a carrier from among carriers by means of which a receipt-confirmed preamble has been transmitted; and a collision sensing signal transmission step in which the mobile stations transmit a preamble used for sensing a collision with another mobile station by means of the selected carrier.

That is, FIG. 13 shows a flowchart for transmission control processing pertaining to the above-described transmission of the collision sensing preamble. As shown in this figure, first of all, in S21, the above-described basic transmission control processing in FIG. 11 is performed. When a preamble receipt confirmation signal is received in this processing (in the event of an affirmative judgment in S22), in S23 a carrier is selected from among carriers by means of which a receipt-confirmed preamble has been transmitted (third carrier selection step). Then, in S24, a preamble used for sensing a collision with another mobile station is transmitted by means of the selected carrier (collision sensing signal transmission step).

The details will be provided subsequently using the drawings, but, according to the present invention as described above, preamble transmission suited to Direct Sequence Code Division Multiple Access that employs a plurality of carriers (Multi-carrier/DS-CDMA) is feasible, and a variety of different kinds of information signals can be efficiently transmitted by means of a random access signal by utilizing multi-carrier characteristics.

The present invention relating to the above-described preamble transmission method can also be seen as an invention of a mobile station as detailed below.

That is, the mobile station according to the present invention is a mobile station which, in an uplink transmission from this mobile station to a base station, to which a direct sequence code division multiple access system that employs a plurality of carriers, is applied, transmits a preamble before transmitting an information symbol sequence, characterized by comprising: carrier selection control means for selecting a carrier from among a plurality of carriers individually for each mobile station; transmission control means for repeatedly transmitting a preamble by means of the selected carrier until a preamble receipt confirmation signal is received from the base station with a prescribed maximum number of preamble transmissions serving as an upper limit number; and power control means for exercising control so as to vary the transmission power used for the transmissions of each carrier.

Further, the constitution is desirably such that the carrier selection control means selects a carrier on the basis of at least one of broadcast information that includes the total transmitted packet volume and the transmitted packet volume of each carrier which are reported by the base station, and the priority level and information volume of the transmitted information symbol sequence.

Also, the constitution desirably includes power control means that exercises control so as to vary the transmission power on the basis of at least one of broadcast information that includes the total transmitted packet volume and the transmitted packet volume of each carrier which are reported by the base station, the priority level and information volume of the transmitted information symbol sequence, and the number of carriers transmitting a preamble.

Furthermore, the constitution desirably further comprises pattern allocation control means for allocating a spreading code pattern to the transmitted preamble on the basis of predetermined rules.

In addition, the constitution is desirably such that the pattern allocation control means varies the spreading code pattern allocated to the preamble on the basis of at least one of the priority level and the information volume of the transmitted information symbol sequence.

In addition, the constitution is desirably such that, upon receiving a preamble receipt confirmation signal from the base station, the carrier selection control means selects a carrier from among carriers by means of which a receipt-confirmed preamble has been transmitted; and the transmission control means transmits an information symbol sequence by means of the selected carrier.

In addition, the constitution is desirably such that, upon receiving a preamble receipt confirmation signal from the base station, the carrier selection control means selects a carrier from among carriers by means of which a receipt-confirmed preamble has been transmitted; and the transmission control means transmits a preamble used for sensing a collision with another mobile station by means of the selected carrier.

Further, the present invention can be viewed from the standpoint of a mobile communications system which comprises a base station and a plurality of mobile stations, and can therefore also be described as follows. In other words, the mobile communications system according to the present invention is a mobile communications system according to which a direct sequence code division multiple access system that employs a plurality of carriers, is applied to an uplink transmission from the mobile stations to the base station, characterized in that each of the mobile stations includes: carrier selection control means for selecting a carrier from among a plurality of carriers individually for each mobile station; transmission control means for repeatedly transmitting a preamble by means of the selected carrier until a preamble receipt confirmation signal is received from the base station with a prescribed maximum number of preamble transmissions serving as an upper limit number; and power control means for exercising control so as to vary the transmission power used for the transmissions of each carrier.

Furthermore, the present invention can be viewed as an invention that relates to a preamble transmission program for causing a computer contained in the mobile station to execute processing, and as an invention that relates to a computer data signal which is embedded in a carrier wave and serves to cause the computer contained in the mobile station to execute processing. The present invention can therefore also be described as follows.

That is, the preamble transmission program according to the present invention, is characterized by being a preamble transmission program for causing a computer, which is housed in a mobile station that transmits a preamble before transmitting an information symbol sequence in an uplink transmission from this mobile station to a base station, to which a direct sequence code division multiple access system that employs a plurality of carriers, is applied, to function as each of the above-described mobile station means.

For example, as shown in FIG. 14, a preamble transmission program 40 is constituted comprising a carrier selection control module 42 for causing the computer contained in the mobile station to function as the above-described carrier selection control means; a transmission control module 43 for causing the computer to function as the above-described transmission control means; a power control module 44 for causing the computer to function as the above-described power control means; a pattern allocation control module 45 for causing the computer to function as the above-described pattern allocation control means; and a main module 41 for controlling the processing overall.

The preamble transmission program according to the present invention, can be recorded on a recording medium (such as a magnetic disk, optical disk, or CD-ROM, for example) which the computer is capable of reading. Further, the constitution may be such that the preamble transmission program is partially or entirely received and stored by the mobile station according to the present invention, via a transmission medium such as a communication line, from another device. Further, the constitution maybe such that the preamble transmission program is transmitted via a transmission medium from the mobile station according to the present invention to another mobile station so as to be installed thereon.

Further, the computer data signal according to the present invention, is characterized by being a computer data signal embedded in a carrier wave and which serves to cause a computer, which is housed in a mobile station that transmits a preamble before transmitting an information symbol sequence in an uplink transmission from this mobile station to a base station, to which a direct sequence code division multiple access system that employs a plurality of carriers, is applied, to function as each of the means of the above-mentioned mobile station.

For example, as shown in FIG. 15, a computer data signal 40S is characterized by being constituted comprising a carrier selection control module 42 for causing the computer contained in the mobile station to function as the above-described carrier selection control means; a transmission control module 43 for causing the computer to function as the above-described transmission control means; a power control module 44 for causing the computer to function as the above-described power control means; a pattern allocation control module 45 for causing the computer to function as the above-described pattern allocation control means; and a main module 41 for controlling the processing overall, this signal being characterized by being embedded in a carrier wave 50.

BEST MODES FOR CARRYING OUT THE INVENTION

Embodiments of the present invention will be described below on the basis of the drawings.

Figure 1:
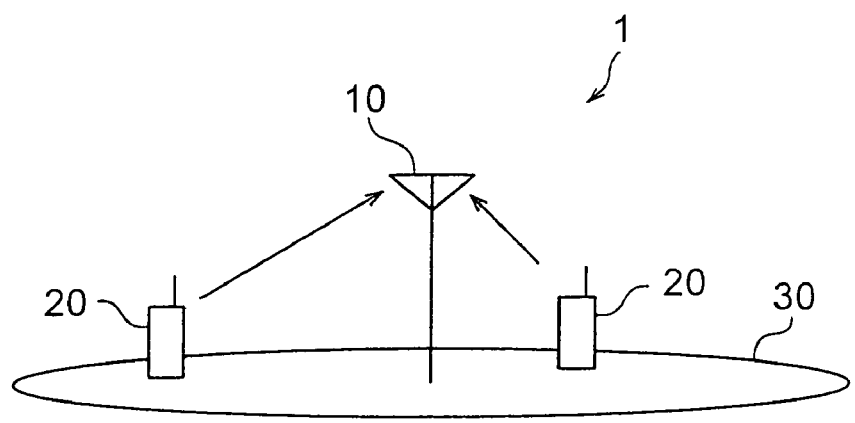
FIG. 1 shows the constitution of the mobile communications system according to each embodiment.

First of all, the constitution of the mobile communications system to which the present invention is applied will be described. As shown in FIG. 1, a mobile communications system 1 according to an embodiment of the present invention is constituted comprising a base station 10, and a plurality of mobile stations 20 which are present in a wireless zone 30 in which the base station 10 is formed. A single mobile station 20 is also acceptable.

Figure 2:
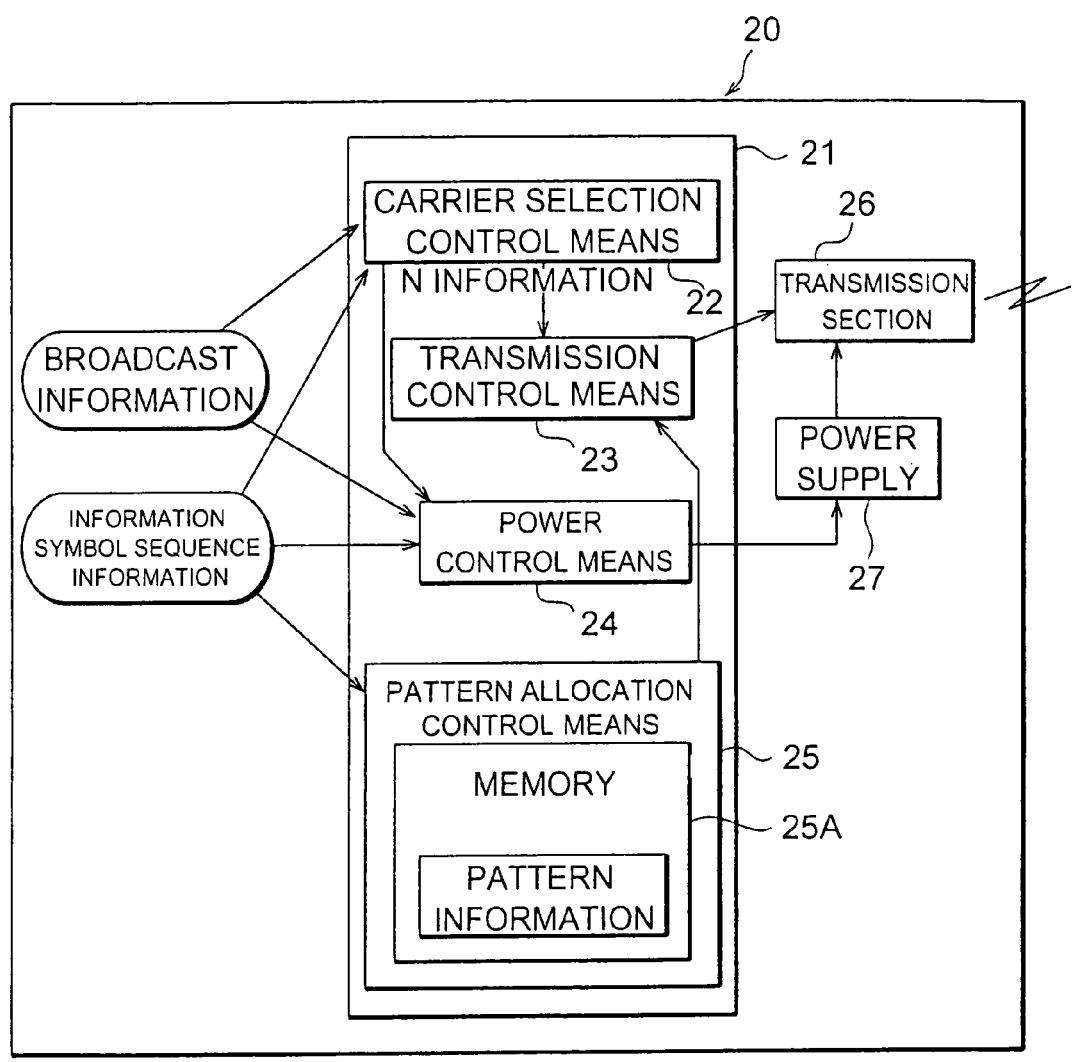
FIG. 2 is a block diagram showing the constitution of the mobile station.

The constitution of the present invention provided for the mobile station 20 will now be described using FIG. 2. As shown in FIG. 2, the constitution of the present invention is such that the mobile station 20 is provided with control means 21 that conduct a control operation (described subsequently) The control means 21 comprises carrier selection control means 22, which determine the number of carriers N used in the preamble transmission (where N is a natural number equal to or more than 1) on the basis of broadcast information (total transmitted packet volume, transmitted packet volume of each carrier, and so forth) and information symbol sequence information (the priority level, information volume, and so forth, of the transmitted information symbol sequence) from the base station, and select N carriers from among a plurality of carriers; transmission control means 23 that perform control such that N preambles are transmitted by a transmission section 26 by means of the N carriers thus selected; power control means 24 that perform control such that the transmission power supplied by a power supply 27 is varied on the basis of the broadcast information, the information symbol sequence information, and the number of carriers N, and so forth; and pattern allocation control means 25, which perform pattern allocation while varying the spreading code pattern allocated to the preamble, on the basis of the information symbol sequence information. Of the aforementioned means, the pattern allocation control means 25 includes a memory 25A, and pattern information for a plurality of spreading codes (described subsequently) is pre-stored in the memory 25A.

Further, of the constituent elements of the mobile station 20, FIG. 2 shows only the constitution which relates to the present invention and it goes without saying that the constituent elements of an ordinary mobile station such as operating buttons and the like are also provided.

Next, embodiments of the preamble transmission method executed by the mobile communications system 1 in FIG. 1 will be described in order.

First Embodiment

Figure 3:
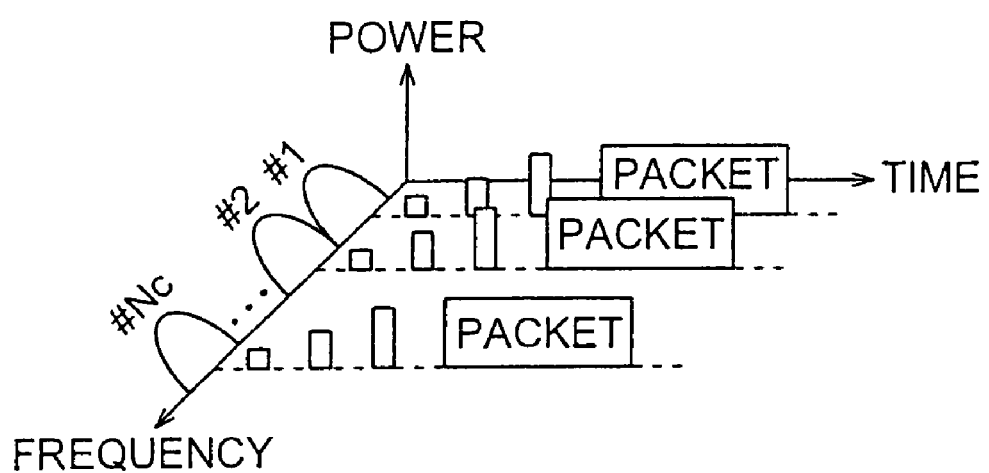
FIG. 3 shows an aspect in which, in Multi-carrier/DS-CDMA, the mobile station performs random access by transmitting a preamble to the base station.

FIG. 3 shows an aspect in which, in Multi-carrier/DS-CDMA that employs a plurality (Nc, Nc≧2) of carriers, the mobile station 20 in FIG. 1 performs random access by transmitting a preamble to the base station 10. In FIG. 3, an aspect is shown in which the mobile station 20 repeatedly transmits a preamble to the base station 10 via Nc carriers by means of the transmission control means 23 and the power control means 24, and varies the preamble transmission power (gradually raising same here) until the mobile station 20 receives a preamble receipt confirmation signal from the base station 10 with the prescribed maximum number of preamble transmissions serving as an upper limit number, before transmitting a packet that includes an information symbol sequence.

As shown in FIG. 3, the mobile station 20 receives a preamble receipt confirmation signal from the base station 10 in the third stage of the transmission power increase process, and then proceeds with packet transmission. The preamble transmission power is varied for each carrier by utilizing information pertaining to each carrier. That is, by performing preamble transmission that uses the characteristic that a plurality of carriers is present, it is possible to implement random access which is flexible and efficient as detailed below.

Further, as shown in FIG. 3, exercising control in which the preamble transmission power is gradually raised has the effect that errors in controlling the power used in transmissions between the mobile station and the base station can be reduced, and, as a result, interference with other mobile stations can be diminished.

More particularly, in the above-described aspect, the present invention is characterized in that, in Multi-carrier/DS-CDMA that employs a plurality (Nc, Nc≧2) of carriers, the mobile station 20 individually selects N (where N is a natural number equal to or more than 1) carriers from among Nc carriers by means of the carrier selection control means 22, and then transmits N preambles via the selected N carriers by means of the transmission control means 23. This process will be described below by using FIGS. 4A and 4B.

Figure 4A:
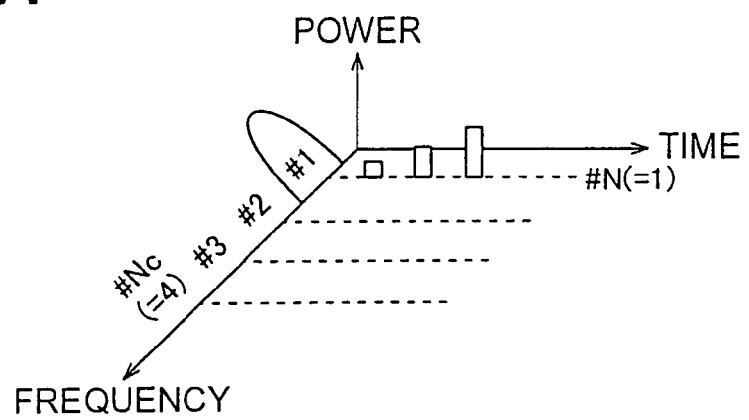
FIG. 4A shows a method for transmitting one preamble by selecting one carrier from among four carriers.
Figure 4B:
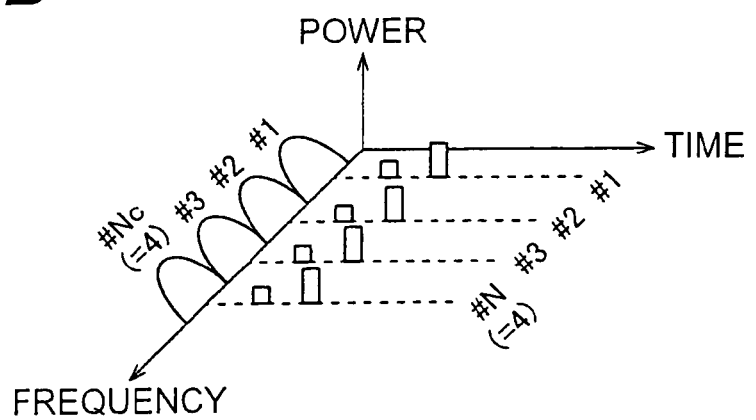
FIG. 4B shows a method for transmitting four preambles by selecting four carriers of four carriers.

FIGS. 4A and 4B illustrate a method according to which, in Multi-carrier/DS-CDMA that employs a plurality (Nc, Nc≧2) of carriers, the mobile station 20 individually selects N (where N is a natural number equal to or more than 1) carriers from among Nc carriers by means of the carrier selection control means 22, and then transmits N preambles via the selected N carriers by means of the transmission control means 23.

Here, Nc=4 is assumed for FIGS. 4A, 4B. Of these two figures, FIG. 4A illustrates a case where N=1, and, because the mobile stations 20 only perform preamble transmission by means of one carrier, preamble collisions can be reduced. Furthermore, because the number of preambles sent by the carrier is diminished, it is possible to reduce interference with other signals using the same frequency band.

On the other hand, FIG. 4B illustrates a case where N=4, and, because the mobile station 20 performs preamble transmission by using a multiplicity of carriers, the probability that the preamble will be detected by the base station 10 is higher and it is therefore possible to further reduce the subsequent delay time until packet transmission. Also, where the carrier via which the preamble detected by the base station 10 is transmitted is concerned, it is highly likely that the state of the propagation path between the mobile station 20 and the base station 10 will be favorable, and therefore, as a result of performing preamble transmission by using a multiplicity of carriers, a carrier for which the state of the propagation path is favorable can be selected from the multiplicity of carriers and appropriated for the subsequent packet transmission. As a result, the transmission quality of the packet transmission can be favorably maintained.

Second Embodiment

Figure 5A:
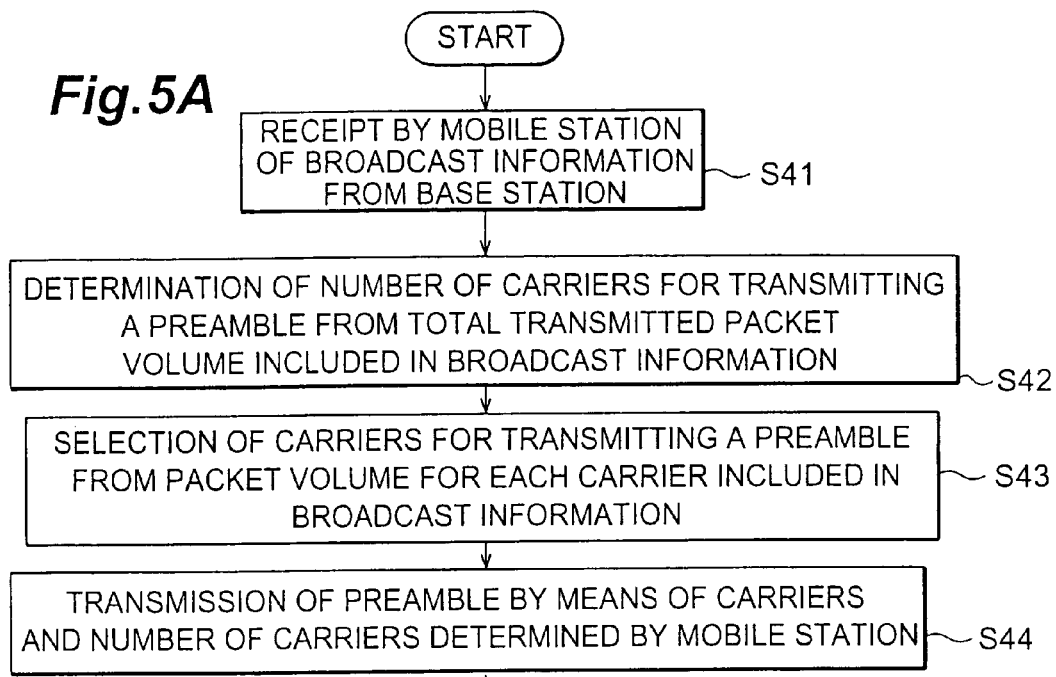
FIG. 5A shows an example in which the carrier selection method and selection quantity is adaptively varied depending on the mobile station, on the basis of broadcast information from the base station.
Figure 5B:
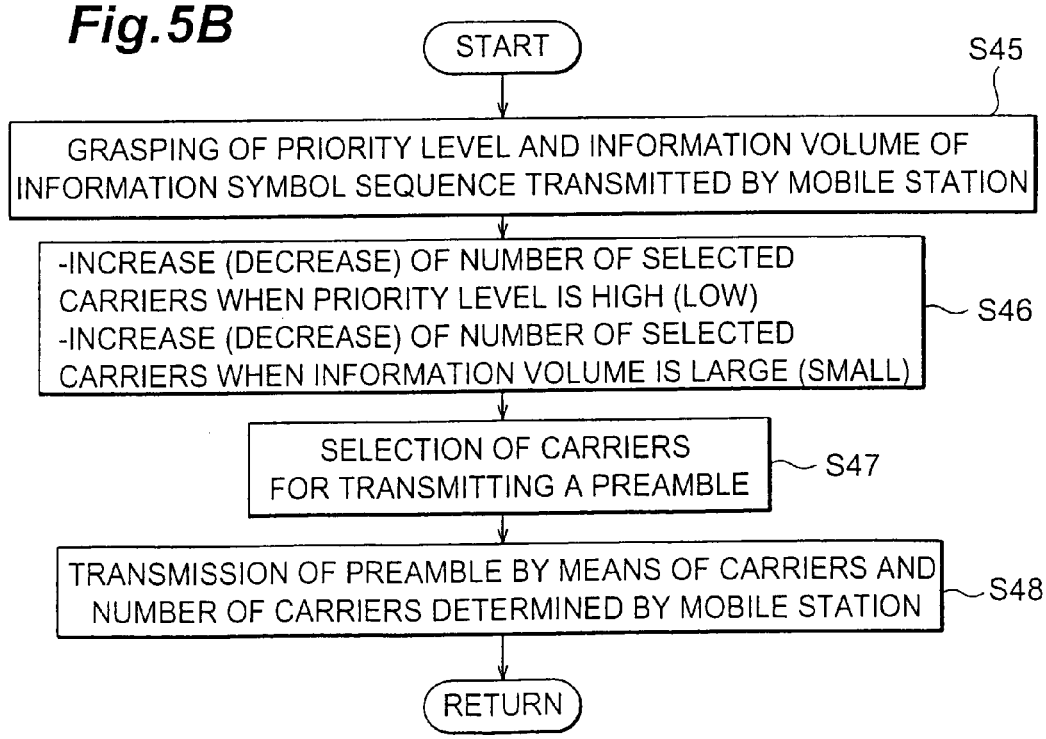
FIG. 5B shows an example in which the selection quantity is adaptively varied in accordance with the priority level and information volume of the transmitted information symbol sequence.

FIGS. 5A and 5B illustrate an example of a case where each mobile station 20 determines the number N of selected carriers and selects N carriers on the basis of broadcast information that includes the total transmitted packet volume and the transmitted packet volume of each carrier and that is reported by the base station 10, and the priority level and information volume of the transmitted information symbol sequence, and so forth.

FIG. 5A is an example of a case where the carrier selection method and the selection number N which are selected by the mobile station 20 are adaptively varied on the basis of the broadcast information from the base station 10. In this FIG. 5A, the broadcast information from the base station 10 includes information on the packet volume which is transmitted by all the carriers (total transmitted packet volume information) and information on the packet volume which is transmitted by each carrier (packet volume information of each carrier).

Upon receiving the broadcast information from the base station 10 in step S41, the mobile station 20 determines, in step S42, the number of carriers N in accordance with the total transmitted packet volume information included in the broadcast information. More specifically, the number N is determined such that, the larger the total transmitted packet volume, the more the number of carriers N is reduced.

In step S43, the carrier selection control means 22 performs carrier selection on the basis of the packet volume information for each carrier which the broadcast information includes. More specifically, carriers whose transmitted packet volumes are smaller are prioritized in the selection. Further, in step S44, the mobile station 20 performs preamble transmission by means of the transmission control means 23 by using the carriers of the determined number of carriers N. Further, although, in FIG. 5A, the number of carriers N and the carriers for transmitting the preamble are determined on the basis of the total transmitted packet volume information and the packet volume information of each carrier, optional combinations may be employed as these evaluation criteria. By performing the processing of FIG. 5A, control can be performed such that interference with packets which are transmitted by using the same frequency band is reduced and the preamble detection probability is therefore raised.

Further, FIG. 5B is an example of a case where the selection number N is adaptively varied in accordance with the priority level and the information volume of the transmitted information symbol sequence. Upon grasping (obtaining information on) the priority level or the information volume of the transmitted information symbol sequence in step S45, the mobile station 20 determines the number of carriers N in accordance with the priority level or the information volume of the information symbol sequence in step S46. More specifically, the number N is determined such that, the higher the priority level or the larger the information volume, the more the number of carriers N is increased. Increasing the number N in a case where the priority level of the information symbol sequence is high or the information volume thereof is large in this manner has the effect of making it possible to raise the preamble detection probability and shorten the delay time until the subsequent transmission of the information symbol sequence.

On the other hand, reducing the number N in a case where the priority level of the information symbol sequence is low or the information volume thereof is small has the effect of making it possible to diminish the interference with other packets. The number N could also be determined from combinations of the priority level and information volume.

Further, thereafter, similarly to FIG. 5A, the carriers of the determined number N are selected in step S47 by the carrier selection control means 22 on the basis of the information on the packet volume for each carrier which is included in the broadcast information, for example. More specifically, carriers whose transmitted packet volumes are smaller are prioritized for selection. Further, in step S48, the mobile station 20 performs preamble transmission by means of the transmission control means 23 by using the carriers of the determined number of carriers N.

Third Embodiment

Figure 6:
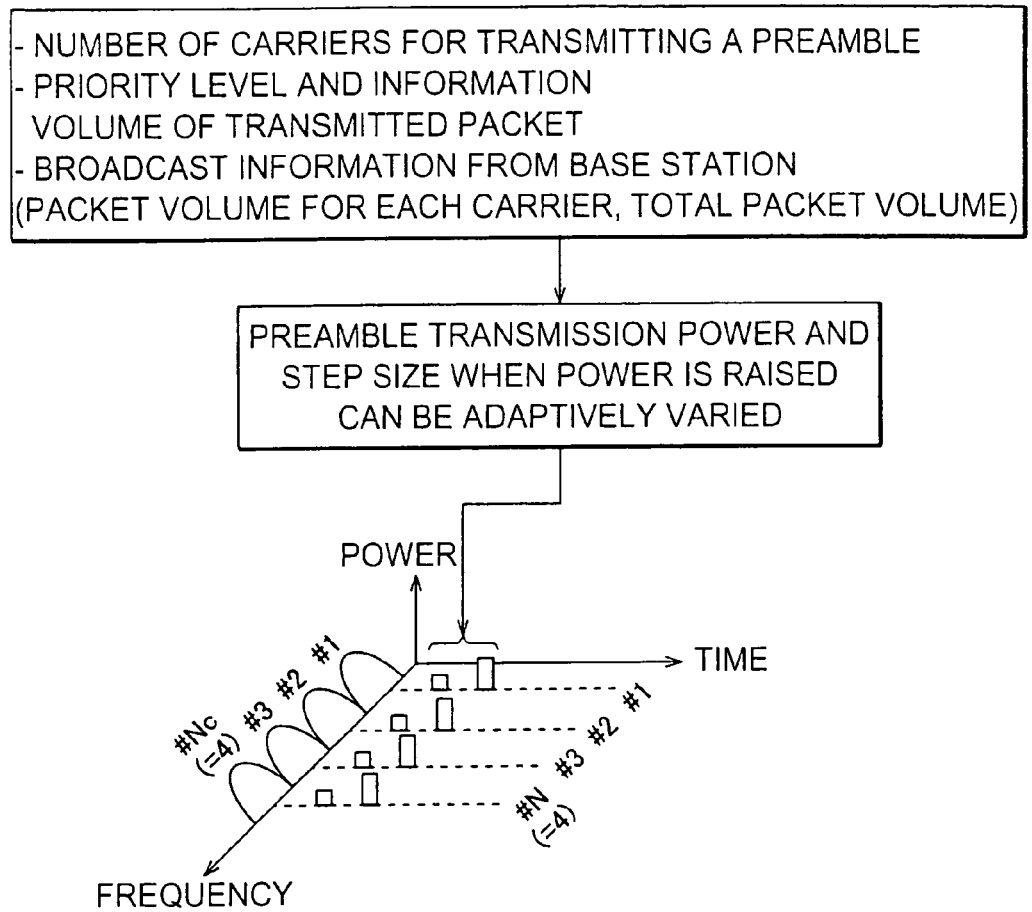
FIG. 6 shows an example in which preamble transmission power control is performed on the basis of the priority level and information volume of the broadcast information and the transmitted information symbol sequence, and the number of carriers.

FIG. 6 shows an example of a case where, when a preamble is transmitted by selecting a plurality of carriers, preamble transmission power control is performed on the basis of broadcast information that includes the total transmitted packet volume and the transmitted packet volume of each carrier, and the priority level and information volume of the transmitted information symbol sequence, and the number of carriers N.

For example, when the selected number of carriers N is large, although there is the advantage that the probability of preamble detection by the base station 10 is then higher, interference with packets transmitted in the same band is a cause for concern. Therefore, control is exercised to reduce the step size when the preamble transmission power is small or the preamble transmission power is gradually increased. As a result, this packet interference can be reduced.

More specifically, supposing that the number of carriers for the preamble transmission is N (natural number), and the total preamble transmission power corresponding to all the carriers is P (real number), the preamble transmission power $P_{sub}$ (real number) for each carrier is then established in accordance with N as follows.

$$P_{sub}=P/N$$

Supposing that the step size when one carrier is transmitted is $\Delta_{max}$ (real number), the step size $\Delta$ (real number) is then established in accordance with N as follows. Further, $\alpha$ expresses a constant (real number)

$$\Delta=\Delta_{max}-(N-1)\times\alpha$$

Further, for carriers whose transmitted packet volume is large based on information on the transmitted packet volume of each carrier which is included in the broadcast information from the base station, control is exercised such that the preamble transmission power and the step size are reduced. As a result, interference with other packets can be reduced.

More specifically, supposing that the transmitted packet volume of a carrier k (natural number) is $G_k$ (real number), the preamble transmission power $P_k$ (real number) of the carrier k is established in accordance with $G_k$ as follows. Further, $P_{max}$ is the maximum transmission power, and β represents a constant (real number).

$$P_k = P_{max} G_k \times \beta$$

Further, the step size $\Delta_k$ (real number) of the carrier k is established in accordance with $G_k$ as below. Further, $\Delta_{max}$ is the step size used in a case where transmission is performed with the maximum transmission power, and γ expresses a constant (real number).

$$\Delta_k = \Delta_{max} - G_k \times \gamma$$

On the other hand, where carriers whose transmitted packet volume is large are concerned, in cases where particular emphasis is laid on completing the transmission promptly, control is exercised such that the preamble transmission power and the step size are increased. As a result, it is possible to raise the probability of the preamble being detected by the base station 10 and shorten the subsequent delay time until packet transmission.

More specifically, supposing that the transmitted packet volume of a carrier k (natural number) is $G_k$ (real number), the preamble transmission power $P_k$ (real number) of the carrier k is established in accordance with $G_k$ as follows. Further, $P_0$ is the preamble transmission power used in a case where transmission is performed at the lowest rate, and β expresses a constant (real number)

$$P_k = P_0 + G_k \times \beta$$

Further, the step size $\Delta_k$ (real number) of the carrier k is established in accordance with $G_k$ as below. Further, $\Delta_0$ is the step size used in a case where transmission is performed at the lowest rate, and γ expresses a constant (real number).

$$\Delta_k = \Delta_0 + G_k \times \gamma$$

In addition, in a case where the priority level of the transmitted information symbol sequence is high, control is exercised such that the preamble transmission power and the step size are increased. As a result, it is possible to raise the probability of the preamble being detected by the base station 10 and shorten the subsequent delay time until packet transmission.

More specifically, supposing that the priority level of the transmission packet is p (where p is a natural number, such that the larger the value of p, the higher the priority level), the preamble transmission power $P_{sub}$ of each carrier is established in accordance with p as below. Further, $P_{p=1}$ is the preamble transmission power of each carrier in a case where p=1, and λ is a constant (real number)

$$P_{sub} = P_{p=1} + (p-1) \times \lambda$$

Further, the step size Δ of each carrier is established in accordance with p as below. Further, $\Delta_{p=1}$ is the step size of each carrier in a case where p=1, and μ is a constant (real number).

$$\Delta_k = \Delta_{p=1} + (p-1) \times \mu$$

Fourth Embodiment

Figure 7A:
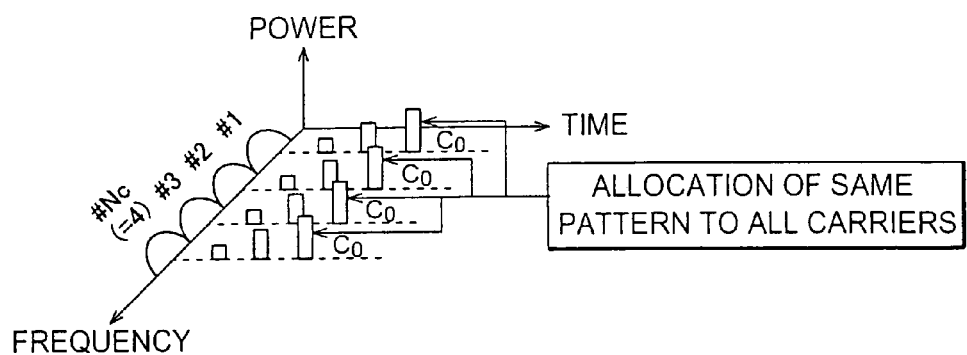
FIG. 7A shows an aspect in which the same spreading code is allocated to all the carriers for transmission from the mobile station.
Figure 7B:
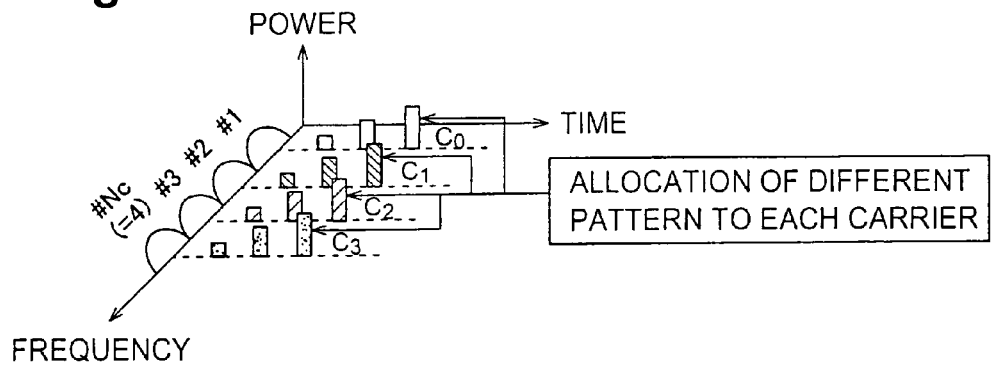
FIG. 7B shows an aspect in which mutually different spreading codes are allocated to the carriers for transmission from the mobile station.

FIGS. 7A and 7B illustrate aspects in which the mobile station 20 allocates spreading code patterns on the basis of predetermined rules to a plurality of transmitted preambles by means of the pattern allocation control means 25. Nc=4 and N=4 are assumed for FIGS. 7A and 7B. FIG. 7A illustrates an aspect in which the same spreading code is allocated to all the N carriers for transmission from the mobile station 20. With this method, there is the advantage of there being one kind of spreading code used at any one time by the mobile station 20, and hence control of the mobile station 20 is simple.

On the other hand, FIG. 7B illustrates an aspect in which mutually different spreading codes are allocated to N carriers for transmission from the mobile station 20. With this method, there is the advantage that, even when there is a plurality of mobile stations from which transmissions are received with the same timing, provided that spreading codes are allocated randomly, these mobile stations can be discriminated from one another and it is thus possible to reduce the probability of signal collision being generated.

Fifth Embodiment

Figure 8A:
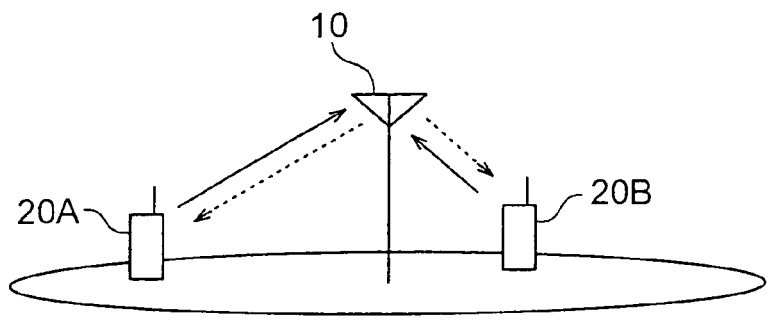
FIG. 8A is an outline view of the mobile communications system according to a fifth embodiment.
Figure 8B:
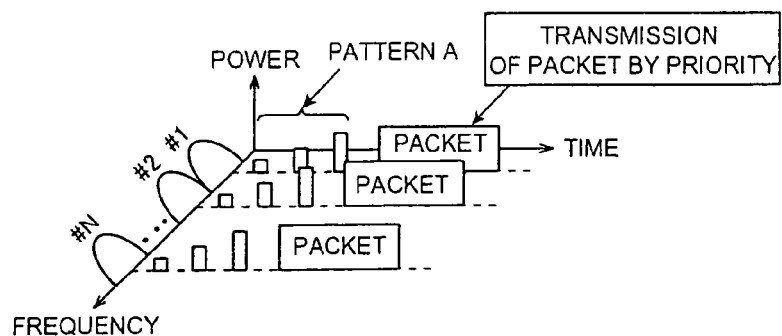
FIG. 8B shows a condition in which a predetermined preamble spreading code pattern A is used in transmissions between the base station and mobile station.
Figure 8C:
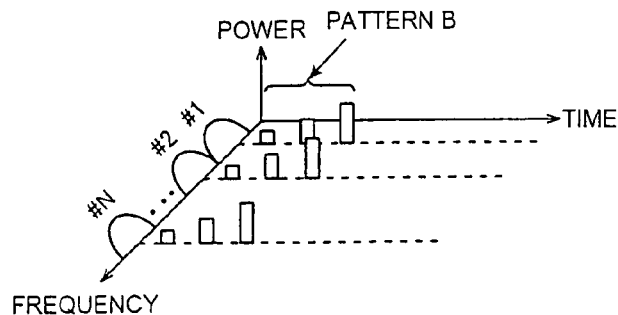
FIG. 8C shows a condition in which a predetermined preamble spreading code pattern B is used in transmissions between the base station and mobile station.

FIGS. 8A to 8C illustrate an example of a case where spreading code patterns allocated to preambles are varied on the basis of the priority level and information volume of the transmitted information symbol sequence. In other words, between the base station 10 and the mobile station 20A and mobile station 20B shown in FIG. 8A, a preamble spreading code pattern A, which corresponds to a case where the priority level of the information symbol sequence is high and the information volume thereof is large, and a preamble spreading code pattern B, which corresponds to a case where the priority level of the information symbol sequence is low and the information volume thereof is small, are predetermined. As a result, for example, in a case where the priority level of the information symbol sequence is high and the information volume thereof is large, the mobile station 20A performs preamble transmission by using the pattern A as shown in FIG. 8B. Further, in a case where the priority level of the information symbol sequence is low and the information volume thereof is small, the mobile station 20B performs preamble transmission by using the pattern B as shown in FIG. 8C. As a result, when the base station 10 detects the preamble spreading code patterns of these mobile stations, the mobile station 20A whose pattern is detected as being the pattern A can be judged as being the mobile station 20A that possesses the information symbol sequence whose priority level is high or whose information volume is large, and therefore control can be implemented such that the mobile station 20A is prioritized for random access.

Sixth Embodiment

Figure 9:
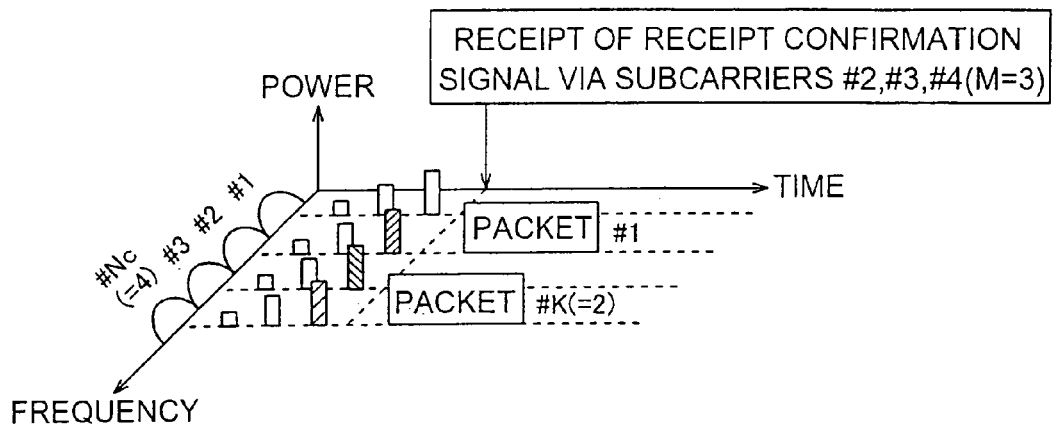
FIG. 9 shows an aspect in which a mobile station transmits an information symbol sequence by a carrier selected from among carriers by means of which a receipt-confirmed preamble has been transmitted.

As shown in FIG. 9, an aspect is illustrated in which, upon receiving a preamble receipt confirmation signal from the base station 10, the mobile station 20 selects, by means of the carrier selection control means 22, K (where K is a natural number equal to or less than M) carriers from among M carriers by means of which a receipt-confirmed preamble has been transmitted, and the information symbol sequence is transmitted by the transmission control means 23 in the form of a packet via the selected K carriers. Here, a case where Nc=4, N=4, M=3, and K=2 is shown by way of example.

Therefore, because the mobile stations 20 perform transmission by selecting the number of carriers K required for the transmission of the information symbol sequence from among M carriers by means of which a receipt-confirmed preamble has been transmitted, the efficiency of the transmission processing when carriers are shared by a plurality of mobile stations 20 can be improved. Further, in a case where the transmission of an information symbol sequence required by the mobile station 20 cannot be performed via M carriers, the transmission can also be performed by using K carriers beforehand.

Seventh Embodiment

Figure 10:
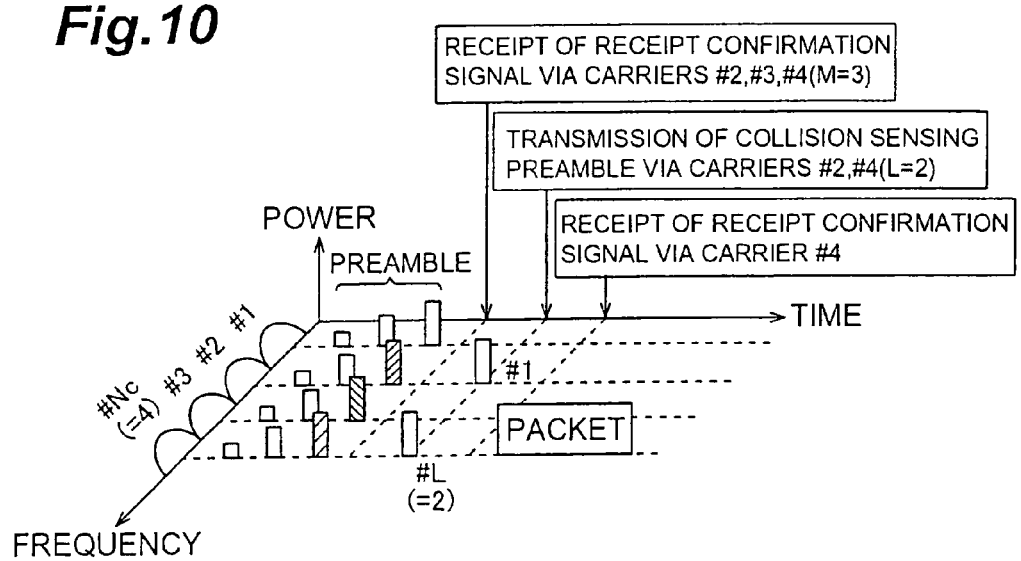
FIG. 10 shows an aspect in which a mobile station transmits a collision sensing preamble by a carrier selected from among carriers by means of which a receipt-confirmed preamble has been transmitted.
Figure 11:
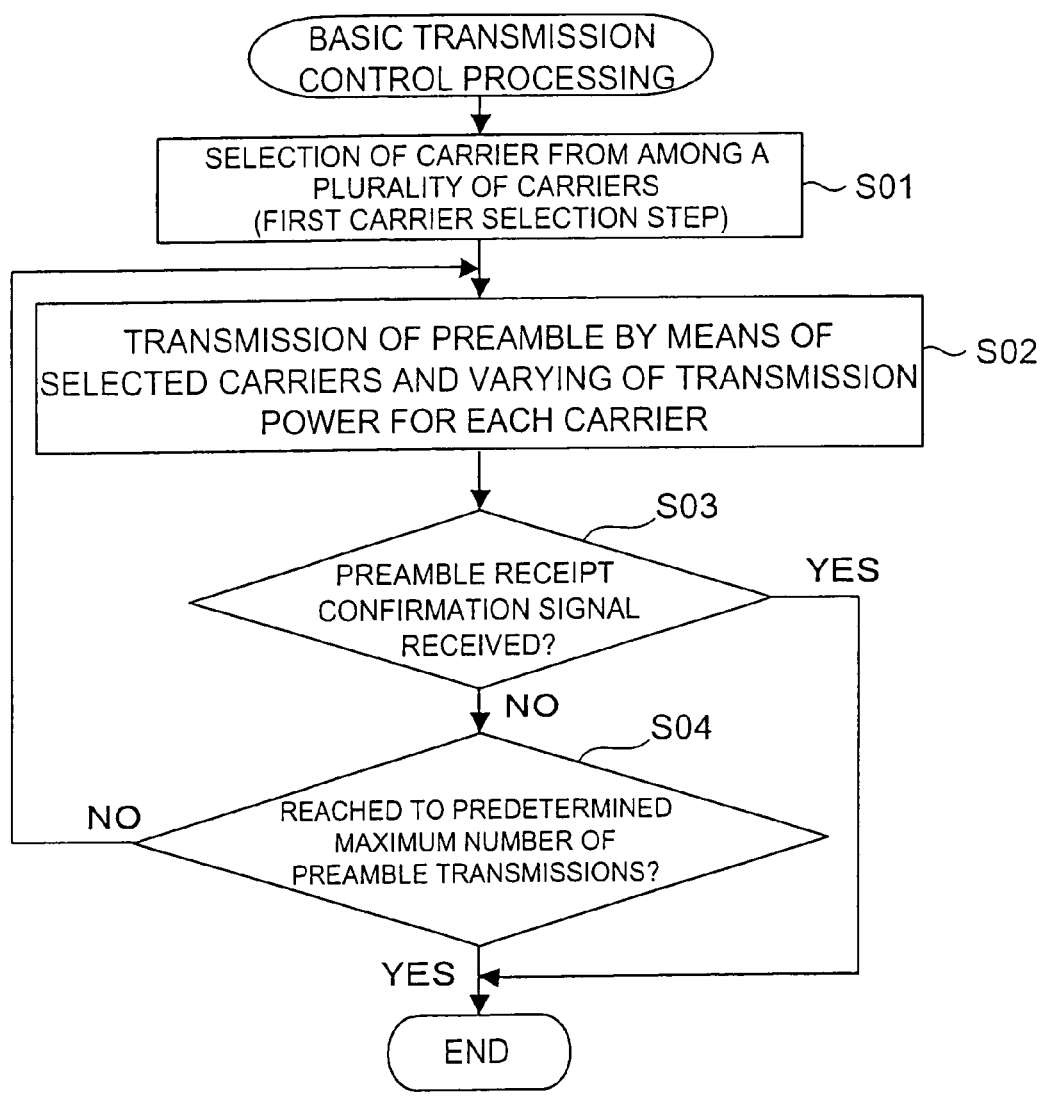
FIG. 11 is a flowchart for transmission control processing in accordance with a preamble transmission method executed individually by each mobile station.
Figure 12:
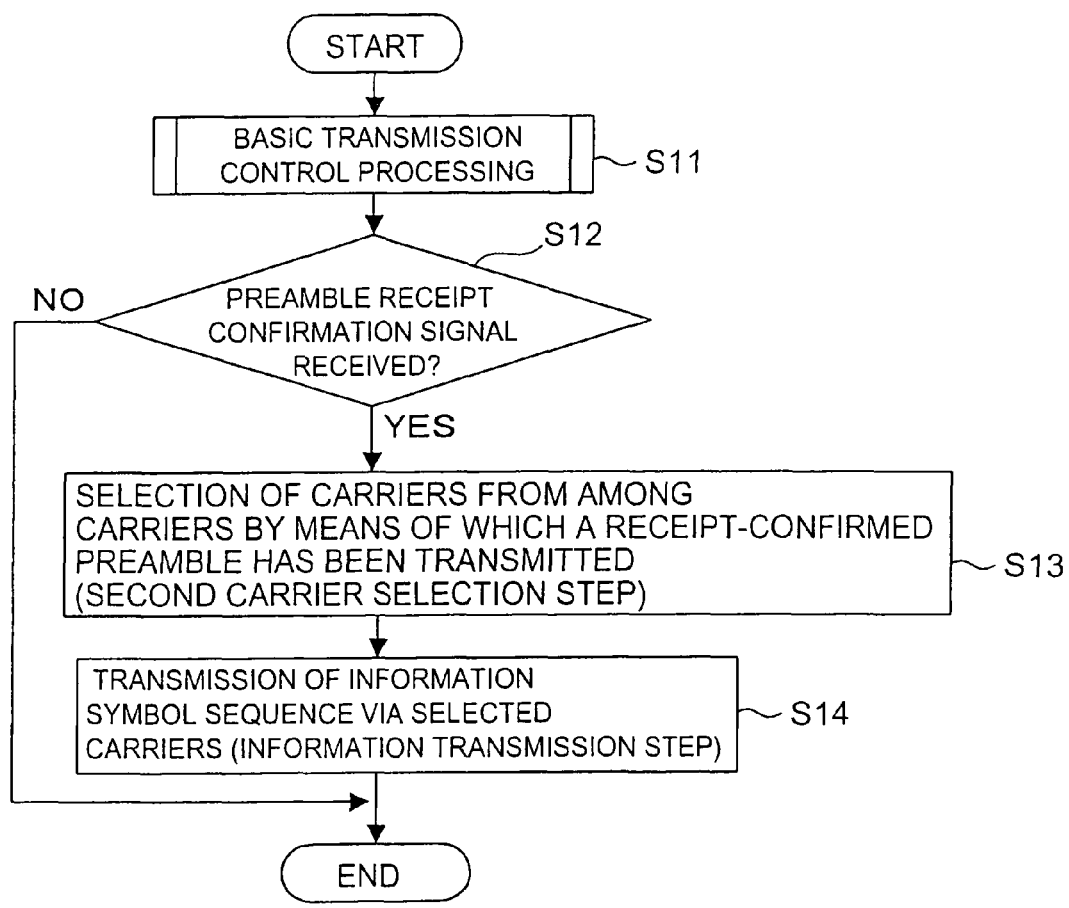
FIG. 12 is a flowchart for transmission control processing pertaining to the transmission of an information symbol sequence.
Figure 13:
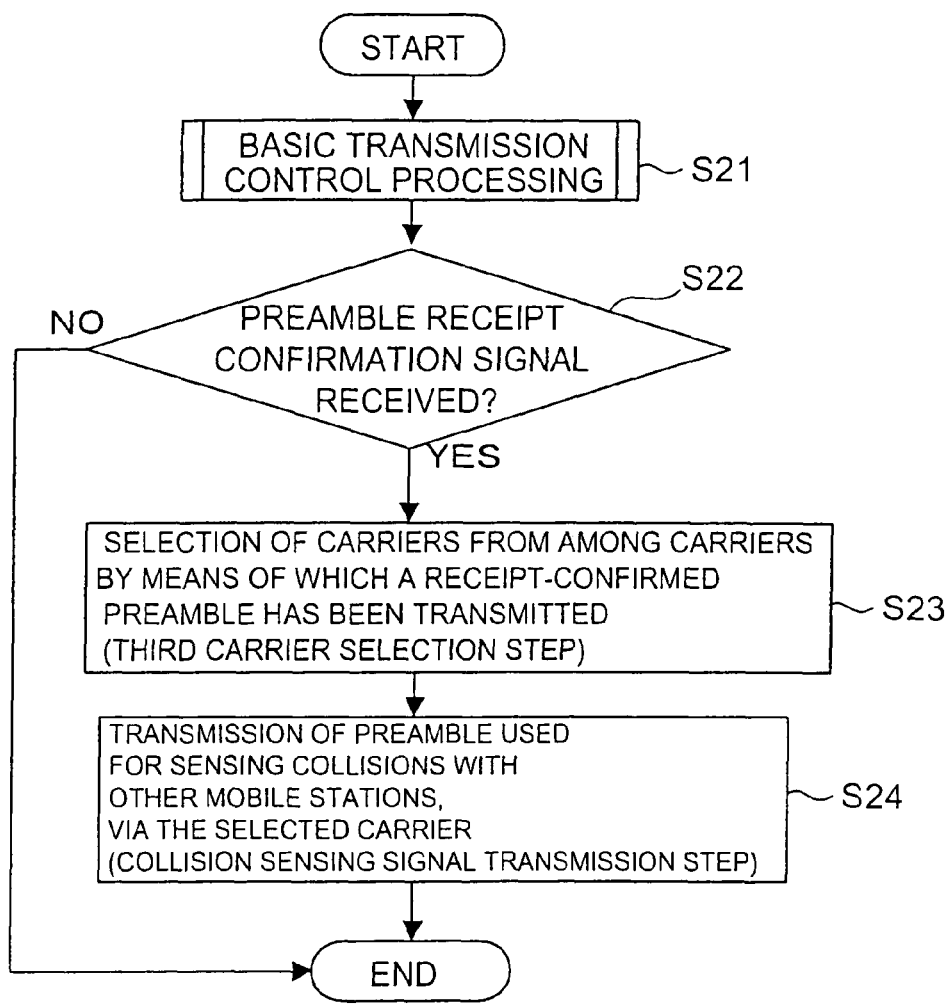
FIG. 13 is a flowchart for transmission control processing pertaining to the transmission of a collision sensing preamble.
Figure 14:
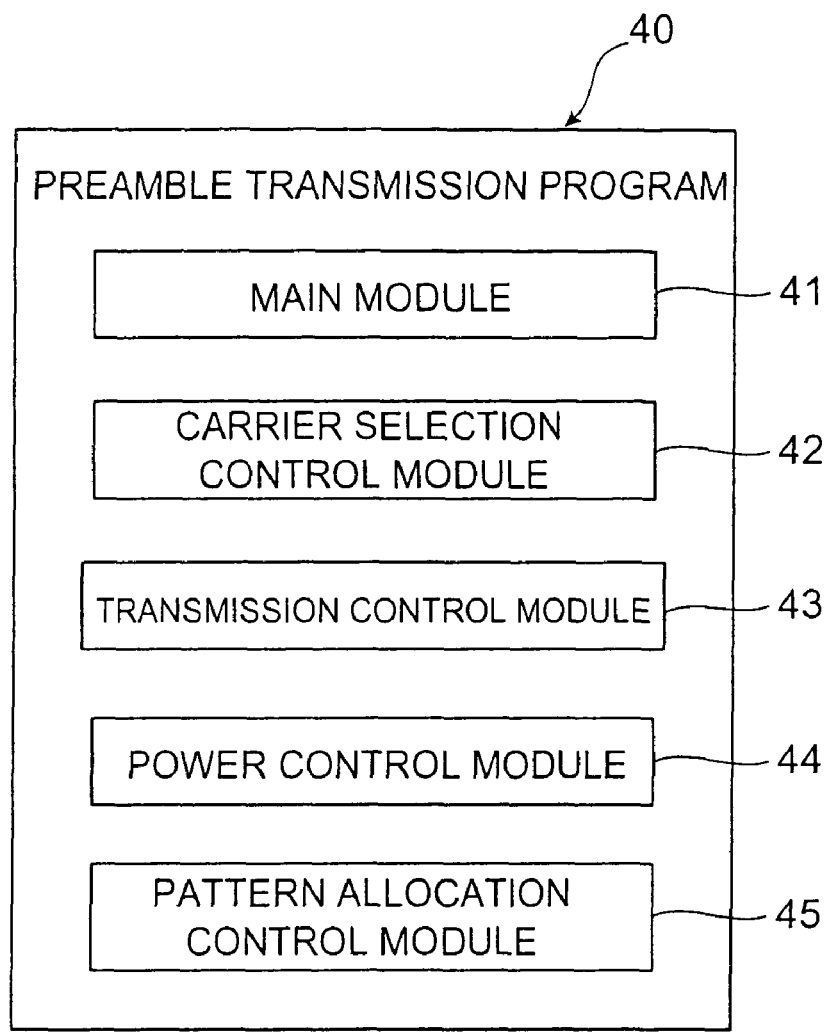
FIG. 14 is a function block diagram showing the constitution of the preamble transmission program.
Figure 15:
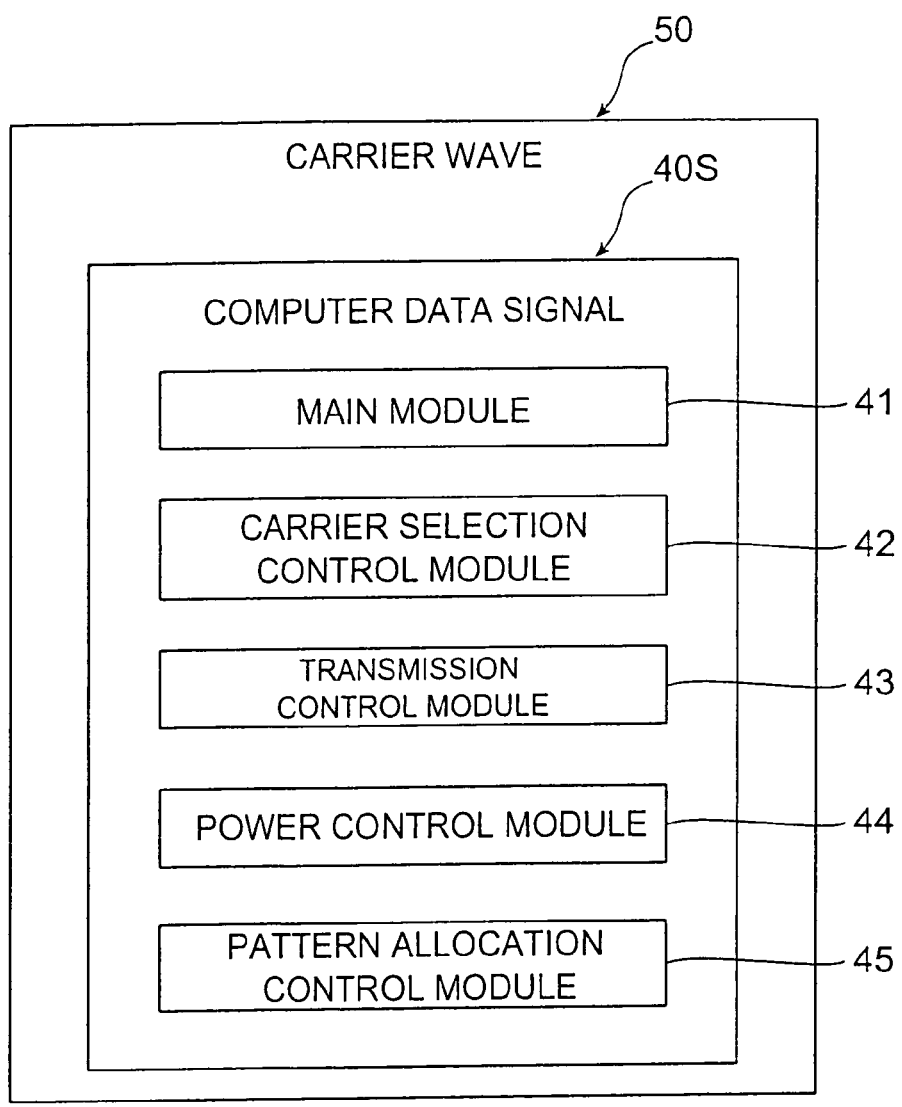
FIG. 15 is a function block diagram showing the constitution of the computer data signal.

As shown in FIG. 10, an aspect is illustrated in which, upon receiving a preamble receipt confirmation signal from the base station 10, the mobile station 20 selects, by means of the carrier selection control means 22, L (where L is a natural number equal to or less than M) carriers from among M carriers by means of which a receipt-confirmed preamble has been transmitted, and transmits L preambles used for sensing a collision with another mobile station via the selected L carriers by means of the transmission control means 23. Here, an example where N=4, M=3, and L=2 is shown.

Such processing compensates for the drawback that, in a case where the base station 10 detects the same preamble received from a plurality of mobile stations 20 with the same timing, the signals of the plurality of mobile stations 20 collide in the subsequent packet transmission. That is, in this processing, because only those mobile stations 20 whose preamble has been detected then transmit a collision sensing preamble, the possibility that the preambles of the plurality of mobile stations 20 will once again be detected by the base station 10 with the same receipt timing is small, and the information symbol sequence is then transmitted via carriers for which receipt of the collision sensing preamble has been confirmed, whereby the probability of packet collision between a plurality of mobile stations 20 can be reduced.

Further, the embodiments of FIGS. 3 to 10 may be optionally combined, and synergistic effects can be expected.

INDUSTRIAL APPLICABILITY

As illustrated hereinabove, according to the present invention, by performing preamble transmission in which the characteristic of there being a plurality of carriers in a direct sequence code division multiple access system that employs a plurality of carriers (Multi-carrier/DS-CDMA) is utilized, it is possible to implement random access which is flexible and efficient.

The invention claimed is:

1. A preamble transmission method according to which, in an uplink transmission from each of a plurality of mobile stations to a base station, to which a direct sequence code division multiple access system that employs a plurality of carriers, is applied, the mobile stations transmit a preamble to the base station before transmitting an information symbol sequence, comprising:

a first carrier selection step in which the mobile stations select at least two carriers from among the plurality of carriers;

a transmission control step in which the preamble is repeatedly transmitted by the at least two selected carriers from each mobile station until a preamble receipt confirmation signal is received at each of the mobile station from the base stations for the associated transmitted preamble with a predetermined maximum number of preamble transmissions serving as an upper limit number as to each selected preamble transmission;

a power control step in which the mobile stations repeatedly vary the transmission power used for the repeated transmissions of the preamble of each selected carrier on the basis of at least one of total transmitted packet volume and transmitted packet volume by each carrier reported by the base station, a priority level and information volume of the transmitted information symbol sequence, and the number of carriers transmitting a preamble;

a second carrier selection step in which the mobile stations further select a symbol sequence carrier for transmitting the information symbol sequence from among each of the plurality of carriers for which the preamble receipt confirmation signal has been received from the base station; and an information symbol sequence transmission step in which the mobile stations transmit the information symbol sequence by the selected symbol sequence carrier.

2. The preamble transmission method according to claim 1, wherein, in the first carrier selection step, the mobile stations select each carrier on the basis of at least one of total transmitted packet volume and transmitted packet volume of each carrier reported by the base station, and a priority level and information volume of the transmitted information symbol sequence.

3. The preamble transmission method according to claim 1, wherein, in the transmission control step, the mobile stations allocate a spreading code pattern to the transmitted preamble on the basis of predetermined rules.

4. The preamble transmission method according to claim 3, wherein, in the transmission control step, the mobile stations vary the spreading code pattern allocated to the preamble on the basis of at least one of a priority level and information volume of the transmitted information symbol sequence.

5. The preamble transmission method according to claim 1, further comprising:

a third carrier selection step in which, after receiving preamble receipt confirmation signals from the base station, the mobile stations select a collision carrier from among each of the carriers associated with each received preamble receipt confirmation signal; and a collision sensing signal transmission step in which the mobile stations transmit a preamble used for sensing a collision with another mobile station by the selected collision carrier.

6. A mobile station which, in an uplink transmission from this mobile station to a base station to which a direct sequence code division multiple access system that employs a plurality of carriers, is applied, transmits a preamble before transmitting an information symbol sequence, comprising:

carrier selection control means for selecting at least two carriers from among the plurality of carriers;

transmission control means for repeatedly transmitting the preamble by the at least two selected carriers with the preamble transmission for each selected carrier of the two selected carriers being repeated until a preamble receipt confirmation signal is received at the mobile station from the base station for the associated carrier preamble with a predetermined maximum number of preamble transmissions serving as an upper limit number; and power control means for exercising control so as to vary the transmission power used for the transmissions of the preamble of each carrier of the at least two carriers, wherein the power control means exercises control so as to vary the transmission power of the preamble of each carrier of the at least two carriers on the basis of at least one of total transmitted packet volume and transmitted packet volume of each carrier reported by the base station, a priority level and information volume of the transmitted information symbol sequence, and the number of carriers transmitting the preamble;

the carrier selection control means further selects a symbol sequence carrier for transmitting the information symbol sequence from among each of the plurality of carriers for which the preamble receipt confirmation signal has been received from the base station; and the transmission control means transmits the information symbol sequence by the selected symbol sequence carrier.

7. The mobile station according to claim 6, wherein the carrier selection control means selects the at least two carriers on the basis of at least one of total transmitted packet volume and transmitted packet volume of each carrier reported by the base station, and a priority level and information volume of the transmitted information symbol sequence.

8. The mobile station according to claim 6, further comprising:

pattern allocation control means for allocating a spreading code pattern to the transmitted preamble on the basis of predetermined rules.

9. The mobile station according to claim 8, wherein the pattern allocation control means varies the spreading code pattern allocated to the preamble being transmitted on the basis of at least one of a priority level and information volume of the transmitted information symbol sequence.

10. The mobile station according to claim 6, wherein the carrier selection control means further selects a collision carrier for transmitting a collision sensing preamble from among each of the plurality of carriers for which the preamble receipt confirmation signal has been received from the base station; and the transmission control means transmits the selected collision sensing preamble used for sensing a collision with another mobile station by the selected collision carrier.

11. A mobile communications system which comprises a base station and a plurality of mobile stations, and according to which a direct sequence code division multiple access system that employs a plurality of carriers, is applied to an uplink transmission from the mobile stations to the base station, wherein each of the mobile stations includes:

carrier selection control means for selecting at least two carriers from among the plurality of carriers;

transmission control means for repeatedly transmitting a preamble by the at least two selected carriers with the preamble transmission for each selected carrier of the two selected carriers being repeated until a preamble receipt confirmation signal is received at each of the mobile stations from the base station for the associated carrier preamble with a predetermined maximum number of preamble transmissions serving as an upper limit number; and power control means for exercising control so as to vary the transmission power used for the transmissions of the preamble of each carrier of the at least two carriers, wherein the power control means exercises control so as to vary the transmission power of the preamble of each carrier of the at least two carriers on the basis of at least one of total transmitted packet volume and transmitted packet volume of each carrier reported by the base station, a priority level and information volume of the transmitted information symbol sequence, and the number of carriers transmitting the preamble;

the carrier selection control means further selects a symbol sequence carrier for transmitting the information symbol sequence from among each of the plurality of carriers for which the preamble receipt confirmation signal has been received from the base station; and the transmission control means transmits the information symbol sequence by the selected symbol sequence carrier.

12. A non-transitory computer-readable recording medium including computer program instructions, which when executed by a mobile station in an uplink transmission from the mobile station to a base station to which a direct sequence code division multiple access system that employs a plurality of carriers, is applied, transmits a preamble before transmitting an information symbol sequence, cause the mobile station to perform a method, comprising:

selecting at least two carrier from among the plurality of carriers;

repeatedly transmitting the preamble by the at least two selected carriers with the preamble transmission for each selected carrier of the two selected carriers being repeated until a preamble receipt confirmation signal is received at the mobile station from the base station for the associated carrier preamble with a predetermined maximum number of preamble transmissions serving as an upper limit number;

varying the transmission power used for the transmissions of the preamble of each carrier of the at least two carriers;

varying the transmission power of the preamble of each carrier of the at least two carriers on the basis of at least one of total transmitted packet volume and transmitted packet volume of each carrier reported by the base station, a priority level and information volume of the transmitted information symbol sequence, and the number of carriers transmitting the preamble;

selecting a symbol sequence carrier for transmitting the information symbol sequence from among each of the plurality of carriers for which the preamble receipt confirmation signal has been received from the base station; and transmitting the information symbol sequence by the selected symbol sequence carrier.

13. The preamble transmission method according to claim 1, wherein the power control step includes repeatedly varying the transmission power used for the repeated transmissions of the preamble of each selected carrier on the basis of total transmitted packet volume and transmitted packet volume by each carrier reported by the base station.

14. The preamble transmission method according to claim 1, wherein the power control step includes repeatedly varying the transmission power used for the repeated transmissions of the preamble of each selected carrier on the basis of a priority level and information volume of the transmitted information symbol sequence.

15. The preamble transmission method according to claim 1, wherein the power control step includes repeatedly varying the transmission power used for the repeated transmissions of the preamble of each selected carrier on the basis of the number of carriers transmitting a preamble.

* * * * *